Patented July 2, 1935

2,006,514

UNITED STATES PATENT OFFICE 2,006,514

SULPHURIZED INDOPHENOLS

Paul Schick and Heinrich Lauth, Frankfort-on-the-Main-Fechenheim, Germany, assignors to General Aniline Works, Inc., New York, N. Y., a corporation of Delaware No Drawing. Application December 11, 1933, Serial No. 701,942. In Germany December 29, 1932

4 Claims. (Cl. 260—19)

Our invention relates to new violet sulphur dyestuffs and a process for making same.

In accordance with our invention valuable violet sulphur dyestuffs are obtained by treating with a sulphurizing agent, according to the method customary for the manufacture of sulphur dyestuffs, an indophenol, (or the corresponding leuco-indophenol) of the type:

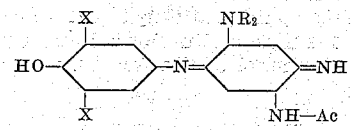

in which X represents hydrogen or halogen, Ac an acyl-radicle of the aliphatic or aromatic series and R hydrogen or an alkyl group, which compound is obtainable for example by joint oxidation of a 1-acylamino-2,4-diamino (or 2-amino-4-dialkyl-amino)-benzene and p-aminophenol or a halogenated substitution product thereof.

The new dyestuffs dye vegetable fibers from the sodium sulphide bath in violet shades of good fastness to washing, boiling acids and light.

In order to further illustrate our invention the following examples are given, the parts being by weight and all temperatures in centigrade degrees; but we wish it, however, to be understood that our invention is not limited to the particular conditions or specific products mentioned therein:—

Example 1

50 parts of the indophenol of the formula:

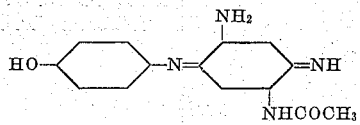

obtained for example by joint oxidation with air of one molecular proportion of 2,4-diamino-1-acetanilide and one molecular proportion of p-aminophenol in an aqueous solution are poured while stirring at about 95° C. into a polysulphide solution prepared from 150 parts of crystallized sodium sulphide and 55 parts of sulphur, whereby solution and reduction take place. The solution is then evaporated until it exhibits a boiling point of 108–109° C. and boiled for about 20 hours under reflux. The dyestuff formed may be isolated in the usual manner for instance by blowing in air into the diluted fusion mass or by adding common salt thereto or by precipitating it with an acid. Advantageously the separated dyestuff is subjected to an oxidizing aftertreatment, for example by blowing air into the aqueous suspension in the presence of alkali hydroxide. The dyestuff dyes the vegetable fiber from the sodium sulphide bath violet shades.

Example 2

50 parts of the leucoindophenol of the formula:

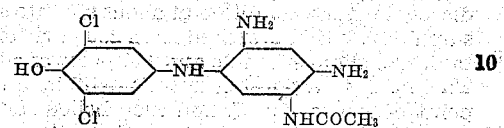

obtained by joint oxidation of equimolecular proportions of 2,4-diamino-1-acetanilide and 2,6-dichloro-4-aminophenol in a weak ammonia solution by means of manganese peroxide and by a subsequent reduction by means of sodium sulphide are poured into a polysulphide solution prepared from 150 parts of crystallized sodium sulphide and 73 parts of sulphur. While stirring the mixture is boiled under reflux for about 20 hours at about 108° C. and the dyestuff, which is very similar in its properties to that of Example 1, is isolated as described in the foregoing example.

Example 3

2,4-diamino-1-propionic acid-anilide of 124 to 125° C. melting point are condensed as described in Example 2 with 2,6-dichloro-4-aminophenol with formation of the leucoindophenol of the formula:

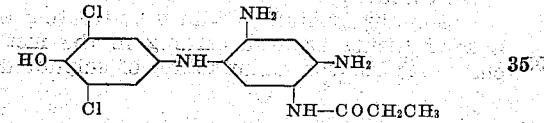

53 parts thereof are poured into a polysulphide solution prepared from 150 parts of crystallized sodium sulphide and 75 parts of sulphur. The mass is boiled under reflux at 107 to 108° C. for about 18 hours. The dyestuff is isolated as described in Example 1. It is very similar with those of the foregoing examples.

Example 4

30 parts of the indophenol of the formula:

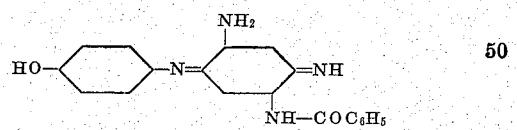

obtained by condensing one molecular proportion of 2,4-diamino-1-benzoic acid anilide-mono-hydrochloride with one molecular proportion of p-nitrosophenol in an aqueous suspension are poured at about 95° C. into a polysulfide solution prepared from 75 parts of crystallized sodium sulphide and 28 parts of sulphur. The mass is boiled under reflux at 109 to 110° C. for 18 to 20 hours and the reaction mass is worked up as described in Example 1. The dyestuff thus obtained dyes the vegetable fiber from a sodium sulphide bath dark violet shades.

*Example 5*

40 parts of 2-amino-4-dimethylamino-acetanilide of 147° C. melting point, obtained by nitrating 4-dimethylamino-acetanilide and reducing the nitrocompound, and 22 parts of p-amino-phenol are oxidized in an hydrochloric acid solution with sodium bichromate. The indophenol thus formed of the formula:

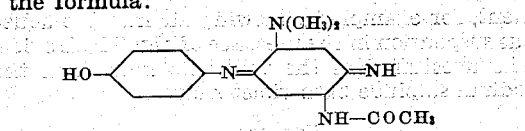

separates as hydrochloride. Then the compound which is isolated by filtration is poured immediately in moist condition at about 95° into a polysulphide solution prepared from 250 parts of crystallized sodium sulphide and 110 parts of sulphur. The mass is evaporated until it exhibits a boiling point of 108 to 109° C. and then boiled for about 24 hours in an apparatus provided with a stirrer and reflux condenser. The dyestuff which is isolated as described in Example 1 dyes the vegetable fiber from a sodium sulphide bath violet shades.

A similar violet dyeing dyestuff is obtained when condensing 144 parts of 2-amino-4-diethylamino-acetanilide of 112° C. melting point, obtained by nitrating 4-diethylamino-acetanilide and reducing the formed nitrocompound of 89° C. melting point, with 22 parts of p-aminophenol and sulphurizing the formed indophenol of the formula:

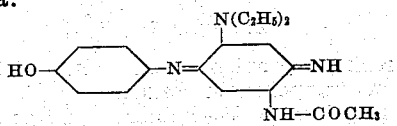

as described in the foregoing examples.

We claim:

1. Sulphur dyestuffs obtained by treating with a sulphurizing agent according to the method customary for the manufacture of sulphur dyestuffs, a compound selected from the group consisting of indophenols and leuco indophenols of the formula:

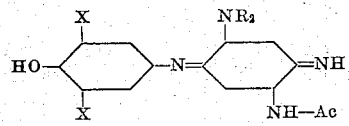

in which X represents hydrogen or halogen, Ac an acyl radicle of the aliphatic or aromatic series and R hydrogen or an alkyl-group, which dyestuffs dye vegetable fibers from the sodium sulphide bath violet shades of good fastness to washing, boiling acids and light.

2. A sulphur dyestuff, obtained by treating with a sulphurizing agent according to the method customary for the manufacture of sulphur dyestuffs, the indophenol of the formula:

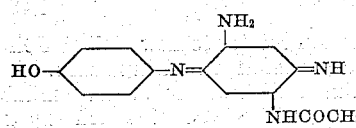

which dyestuff dyes vegetable fibers from the sodium sulphide bath violet shades of good fastness to washing, boiling acids and light.

3. A sulphur dyestuff, obtained by treating with a sulphurizing agent according to the method customary for the manufacture of sulphur dyestuffs, the leuco indophenol of the formula:

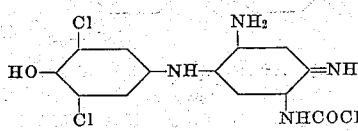

which dyestuff dyes vegetable fibers from the sodium sulphide bath violet shades of good fastness to washing, boiling acids and light.

4. A sulphur dyestuff, obtained by treating with a sulphurizing agent according to the method customary for the manufacture of sulphur dyestuffs, the indophenol of the formula:

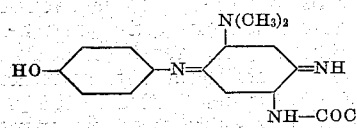

which dyestuff dyes vegetable fibers from the sodium sulphide bath violet shades of good fastness to washing, boiling acids and light.

PAUL SCHICK.
HEINRICH LAUTH.